Aug. 21, 1951  C. F. MATTINGLY  2,565,142
INSECT TRAP
Filed Nov. 25, 1946
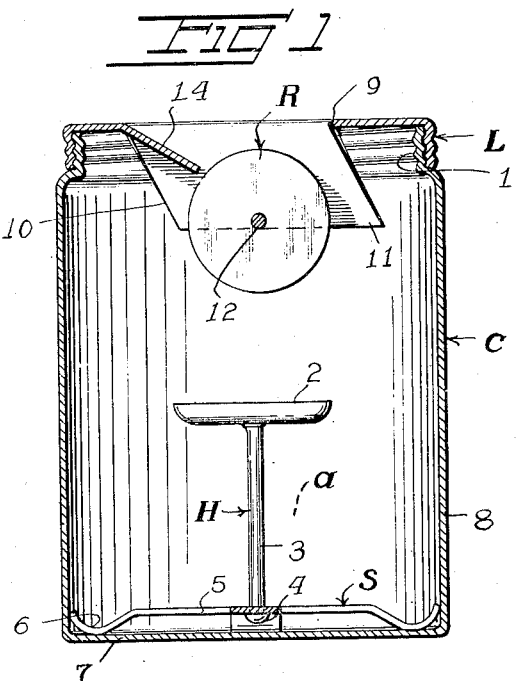
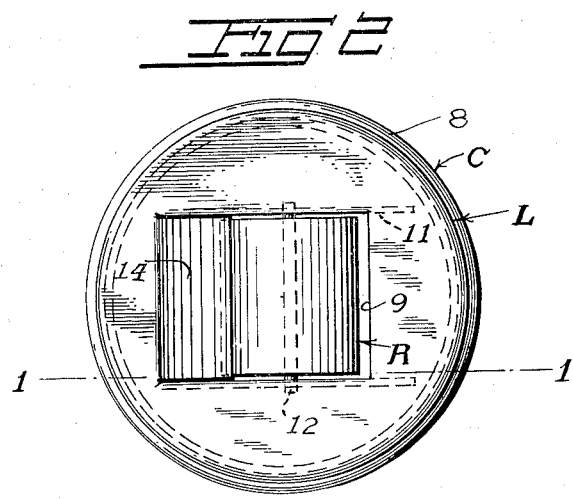
Inventor
Charles F. Mattingly
By Wilfred E. Lawson
Attorney Patented Aug. 21, 1951

2,565,142

UNITED STATES PATENT OFFICE 2,565,142

INSECT TRAP

Charles F. Mattingly, Houston, Tex.

Application November 25, 1946, Serial No. 712,191

1 Claim. (Cl. 43—121)

This invention relates to an insect trap, and it is primarily an object of the invention to provide a trap of this kind especially designed and adapted for use in connection with roaches, termites or the like.

Another object of the invention is to provide an insect trap of a character wherein the captives are exterminated by drowning and wherein the device is provided with means for luring the insects into the trap.

A still further object of the invention is to provide a trap of this kind provided with means whereby the bait is so positioned within the trap as to be accessible only by the insects, such as roaches, termites or the like, which will enter the trap and jump or leap for the bait.

The invention consists in the details of construction and in the combination and arrangement of the several parts of the improved trap whereby certain important advantages are attained, as will be hereinafter more fully set forth.

In order that the invention may be the better understood, I will now proceed to describe the same with reference to the accompanying drawings, wherein Figure 1 is a view partly in vertical section and partly in elevation of a trap constructed in accordance with an embodiment of the invention; and Figure 2 is a view in top plan of the trap as illustrated in Figure 1.

As illustrated in the accompanying drawings, C denotes a container of desired capacity and which is preferably of a well known Mason jar type and which has its top or open end closed.

Positioned within the lower portion of the container C is a bait holder H and as illustrated in the accompanying drawings, this holder H comprises a dish-like receptacle 2 of desired dimensions and which is carried at the upper end portion of an elongated stem 3, said stem being substantially at the axial center of the receptacle 2.

The outer or lower extremity of the stem 3 is secured as at 4 to the central portion of a stand S. This stand S is herein disclosed as comprising two crossed members 5 substantially at right angles to each other and preferably of a material possessing a certain degree of inherent resiliency. The outer extremities of these arms 5 are disposed on downwardly directed outbows 6, which may be termed as feet for the stand S when the holder H is in applied position within the container C. These feet F are adapted to, in most instances, have direct contact with the bottom 7 of the container C with the outer or free extremities of the feet F having yielding contact with the adjacent side wall 8 of the container C.

The stem 3 is of a considerable length so that when the trap is in use water can be placed within the container and said receptacle is at a considerable distance above the approximate water line $a$.

It is also to be pointed out that the receptacle 2 while of a fair size, is of such a radius as to be entirely free from the side wall 8 of the container and spaced a material distance therefrom. This is of advantage because roaches, ants or other insects crawling down into the container C are prevented from having access to the bait placed upon the receptacle 2.

In referring to the water level $a$ it is to be understood that the fluid placed within the container C may be kerosene or such other fluid which is best suited for the purposes desired.

The lid or cap L in its central part is provided with an opening 9 herein disclosed as rectangular and which opening has depending from opposed margins the inwardly disposed flanges 10 which constitute a frame. The flanges 10 have pivotally engaged therewith as at 12 a roller R. The mountings 12 for the roller R, as is clearly illustrated in Figure 1, are slightly to one side of the axial center of the receptacle 2 and to the side of such center towards which the flanges 10 are inclined. The bite of the roller R the least remote from the axial center of the container C is closely approached by the lower marginal edge of one of the flanges 10, while the lower marginal portion of the second flange 10 is spaced from the periphery of the roller R a distance to assure an escapement 14 of sufficient area.

The lid or cover L along one side of the opening 9 and between the flanges 10 is provided with a downwardly and inwardly inclined plate 14 which is herein disclosed as extending along the marginal portion of the opening 9 at the side of the axial center opposed to the side of such center in which the shaft 12 is positioned.

After the insects light upon the roller R, they will overbalance the roller which is normally perfectly balanced. As the rotation of the roller under the weight of the insects thereon is faster than the insects can crawl back, such insects as they reach the bottom of rotation of the roller will hang there until such time that, through exhaustion or otherwise, they will drop therefrom into the fluid within the bottom of the container C.

The plate or runway 14 serves as a guard or shield to assure the insects lighting upon the roller R from above to travel to that side of the roller to assure the desired rotation of the roller in a direction away from the runway or plate 14. This runway or plate 14 also serves to prevent any insects which might be carried upwardly therebeneath from passing above the runway or plate 14 and thus be in a position to escape out through the opening 9.

It is also to be pointed out that the roller R is of a diameter substantially equal to that of the receptacle 2 and is so positioned within the frame to assure one side bite of the roller projecting slightly beyond the periphery of the receptacle 2 and at the side of such receptacle towards which the roller R downwardly rotates. This is of importance as it assures the insects generally as they drop from the roller R passing on down to the bottom of the container between the wall of the container and the receptacle 2.

From the foregoing description it is thought to be obvious that an insect trap constructed in accordance with my invention is particularly well adapted for use by reason of the convenience and facility with which it may be assembled and operated.

I claim:

An insect trap comprising a receptacle having a top wall, the wall having a rectangular opening therein, depending flanges at opposite sides of the opening, a roller pivotally supported between the flanges for rotation on an axis extending transversely of the opposing faces of the flanges, the periphery of the roller at its high side being a substantial distance below the plane of the top wall, a guard plate extending inwardly and downwardly from an edge of the opening paralleling said axis, said edge being located in a vertical plane to one side of the periphery of the roller, said guard plate having its bottom edge in close proximity to the said one side of the roller periphery and in a horizontal plane a substantial distance below the highest part of the roller periphery to prevent an insect passing between the plate edge and the roller surface, the peripheral surface of the roller at the opposite side from the plate being spaced a substantial distance from that other edge of the opening which parallels the axis to permit an insect to ride through the opening on the surface of the roller when the roller turns in one direction, and bait carrying means in the receptacle below the roller, said bait carrying means being in the form of a cup and being disposed to have its edge at one side in a vertical plane tangent to the periphery of the roller at the side of the roller remote from said plate whereby insects dropping from such side of the roller will not drop into the cup.

CHARLES F. MATTINGLY.

REFERENCES CITED

The following references are of record in the file of this patent:

UNITED STATES PATENTS

| Number | Name | Date |
|---|---|---|
| 507,098 | Bates | Oct. 24, 1893 |
| 1,050,220 | Link | Jan. 14, 1913 |
| 1,116,993 | Carlson | Nov. 10, 1914 |
| 1,211,379 | Maisch | Jan. 2, 1917 |
| 1,645,225 | Brzykcy | Oct. 11, 1927 |
| 1,715,958 | Strand | June 4, 1929 |
| 1,753,210 | Melville | Apr. 8, 1930 |
| 2,100,909 | Mora | Nov. 30, 1937 |

FOREIGN PATENTS

| Number | Country | Date |
|---|---|---|
| 4,987 | Great Britain | of 1911 |
| 21,781 | Great Britain | of 1902 |
| 22,007 | Great Britain | of 1903 |
| 38,295 | Sweden | Feb. 3, 1915 |